(12) United States Patent
Wilhelmsson

(10) Patent No.: US 7,769,094 B2
(45) Date of Patent: Aug. 3, 2010

(54) ARRANGEMENT AND METHOD FOR REDUCING THE IMPACT OF INTERFERING SIGNALS IN A COMMUNICATION SYSTEM

(75) Inventor: Leif Wilhelmsson, Dalby (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 896 days.

(21) Appl. No.: 11/558,775

(22) Filed: Nov. 10, 2006

(65) Prior Publication Data

US 2008/0112518 A1    May 15, 2008

(51) Int. Cl.
H04L 27/28 (2006.01)
H03K 5/01 (2006.01)
H04L 1/00 (2006.01)
(52) U.S. Cl. .................................. 375/260; 375/346
(58) Field of Classification Search .......... 375/260, 375/346, 350
See application file for complete search history.

(56) References Cited

U.S. PATENT DOCUMENTS

| 6,771,591 | B1 | 8/2004 | Belotserkovsky et al. |
| 7,580,468 | B2 * | 8/2009 | Zhidkov et al. ............ 375/260 |
| 2002/0073436 | A1 | 6/2002 | Cowley et al. |
| 2004/0085891 | A1 | 5/2004 | Henriksson |
| 2005/0213692 | A1 | 9/2005 | Zhidkov |
| 2005/0220001 | A1 | 10/2005 | Henriksson |
| 2006/0116095 | A1 | 6/2006 | Henriksson |
| 2007/0153760 | A1 * | 7/2007 | Shapira ...................... 370/350 |
| 2008/0069250 | A1 * | 3/2008 | Nee ........................... 375/260 |

FOREIGN PATENT DOCUMENTS

| EP | 0 837 582 A2 | 4/1998 |
| EP | 1 276 289 A2 | 1/2003 |
| EP | 1 531 592 A2 | 5/2005 |
| GB | 2 385 756 A | 1/2003 |
| WO | WO 01/69878 A1 | 9/2001 |
| WO | WO 2005/002164 A1 | 1/2005 |

OTHER PUBLICATIONS

Zhou Z, et al.; "Real-time ISI free window tracking scheme for OFDM systems," 60th IEEE Vehicular Technology Conference, Sep. 2004, (WTC 2004-Fall), vol. 6, pp. 4325-4329.

(Continued)

Primary Examiner—David B Lugo

(57) ABSTRACT

An arrangement and method in a communication system such as an Orthogonal Frequency Division Multiplexing (OFDM) radio receiver for reducing the impact of interference from an intermittent interfering signal transmitted by an interfering system which may be co-located with the OFDM system or may be remotely located. Each OFDM symbol in a received OFDM signal includes a guard interval (GI), a middle portion, and a last portion identical to the GI. The arrangement determines which portion of each OFDM symbol is contemporaneous with the interfering signal and time-shifts a fast Fourier transform (FFT) window in the OFDM receiver to minimize or eliminate FFT processing of samples of the OFDM symbol that are contemporaneous with the interfering signal, thereby minimizing the impact of the interfering signal.

14 Claims, 5 Drawing Sheets

OTHER PUBLICATIONS

Skiskovic, M., "Signal processing algorithm for OFDM channel with impulse noise," 7$^{th}$ IEEE International Conference on Electronics, Circuits and Systems, Dec. 2000 (ICECS 2000), vol. 2, pp. 222-225.

Muller-Weinfurtner, S.H. & Huber, J.B., "Optimum Nyquist windowing for improved OFDM receivers," Proceedings of the IEEE Global Telecommunications Conference, Nov. 2000, (GLOBECOM '00), vol. 2, pp. 711-715.

Muschallik C, "Improving an OFDM reception using an adaptive Nyquist windowing," IEEE Transactions on Consumer Electronics, vol. 42, No. 3, Aug. 1996, pp. 259-269.

\* cited by examiner

ARRANGEMENT AND METHOD FOR REDUCING THE IMPACT OF INTERFERING SIGNALS IN A COMMUNICATION SYSTEM

STATEMENT REGARDING FEDERALLY SPONSORED RESEARCH OR DEVELOPMENT

Not Applicable

CROSS-REFERENCE TO RELATED APPLICATIONS

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

This invention relates to radio communication systems. More particularly, and not by way of limitation, the invention is directed to an arrangement and method for reducing the impact of an interfering signal in a communication system. The preferred embodiment is described in terms of a radio system utilizing Orthogonal Frequency Division Multiplexing (OFDM).

The number of transceivers in devices such as mobile phones, personal digital assistants (PDAs), laptops, and the like is increasing at the same time as many of these devices are becoming smaller. This means that it is becoming more important that these different radio frequency (RF) systems co-exist without seriously degrading the performance of other systems. Several of the emerging technologies that are expected to be found in mobile phones and similar devices in the near future are using OFDM to increase the number of users within a given frequency band. For example, OFDM is used for Wireless Local Area Networks (WLAN), Broadband Access (Wi-Max), and Digital Broadcasting (DVB-T, DVB-H, DAB). OFDM has also been proposed for the next generation (4G) of cellular networks.

OFDM is especially suitable for situations where the channel is highly time-dispersive. Time-dispersion causes part of the OFDM symbol to be corrupted due to inter-symbol interference (ISI). OFDM systems, therefore, are typically designed with some amount of redundancy in the received signal, with part of the received signal being removed by the receiver prior to further processing. If the received signal is processed properly, the part of the signal corrupted by ISI does not have any impact on the overall performance.

FIG. 1 is an illustrative drawing of three symbols (Symbol k−1, Symbol k, and Symbol k+1) in a conventional OFDM signal. Each symbol includes a first portion referred to as a guard interval (GI) 11. The GI is transmitted over a time interval Tg. The GI is followed by other information 12 transmitted over a time interval Tu. At the end of each symbol is a portion 13 of the other information in which the information in the GI is repeated. The purpose of the GI is to ensure that the there is no ISI between the "actual" symbols. The GI is sometimes referred to as a Cyclic Prefix (CP).

FIG. 2 is a simplified flow chart of a conventional OFDM transmission process. At step 15, an inverse fast Fourier transform (IFFT) is used to modulate the information signals to form the symbols. At step 16, the last portion of each symbol is copied and added to the beginning of the symbol to form the GI. Further processing not relevant to the present invention is then performed at step 17 to form the transmitted signal 18.

FIG. 3 is a simplified flow chart of a conventional OFDM reception process. The transmitted signal 18 is received, and at step 21 front-end processing not relevant to the present invention is performed. At step 22, the receiver removes the GI 11. At step 23, an FFT is used to demodulate and recover the information signals. As shown in FIGS. 2 and 3, one can view OFDM as if the signal is generated in the frequency domain, transformed to the time domain by the IFFT, transmitted in the time domain, transformed back to the frequency domain by the FFT, and then further processed.

FIG. 4 is an illustrative drawing of a conventional windowing process for removing the GIs from a series of received symbols prior to the FFT. By setting a window value to one (1) during an FFT window 25, and setting the window value to zero (0) during the GI 11, the information in the GI is discarded.

FIG. 5 is an illustrative drawing of a series of conventional received symbols and a strong interfering signal 28, which is present for only a small fraction of each FFT window 25. The interfering signal is intermittent in time, and is not synchronized to the OFDM signal. For example, the interfering signal may be a Bluetooth signal and the duration of the bursts may then be approximately 300 µs. The OFDM signal, on the other hand, may be a DVB-H signal, in which case the total duration of each symbol, including the GI, is about 1.1 ms. As illustrated in FIG. 5, the interfering signal 28 interferes with the GI of Symbol k−1, the middle portion of Symbol k, and the last portion of Symbol k+1. Since the GI is discarded by the receiver, the interfering signal will have no effect on Symbol k−1, whereas the quality of the two other OFDM symbols may be degraded.

Since OFDM symbols have relatively long duration, the probability that some portion of the symbol will be interfered with becomes relatively large even if the interfering signal is only present for a small fraction of the symbol duration. Also, if the interfering signal is very strong, then only a small part of the OFDM symbol needs to be disturbed in order to significantly degrade the performance of the OFDM system. Additionally, OFDM systems are typically designed to handle certain channel conditions such as maximum delay spread and maximum Doppler, but are not designed to handle strong interference caused by the receiver being co-located with a transmitter of another system. Therefore, even an interfering signal of short duration and low power may seriously degrade the OFDM performance.

Problems may also be encountered if link adaptation is employed. With link adaptation, coding and modulation are adapted based on the estimated channel conditions. If a co-located system interferes with the OFDM system, the system may erroneously conclude that the communication between the transmitter and the receiver is poor. As a result, the coding and modulation may be upgraded accordingly. The algorithms for link adaptation are typically developed based on the assumption that interference is due to other users of the same type of RF system (e.g., other OFDM users). Therefore, the algorithms may malfunction when the interference is caused by different, co-located RF systems.

What is needed in the art is an arrangement and method for providing robustness in communication systems that overcomes the shortcomings of the prior art. Such a system and method should reduce the impact of interference from interfering systems external to the device in which the communication system is operating and from interfering systems co-existing within the same device. The present invention provides such an arrangement and method.

BRIEF SUMMARY OF THE INVENTION

The present invention provides robustness in communication systems against intermittent interfering signals from other RF systems. The invention reduces the impact of interference from interfering systems external to the device in which the communication system is operating and from interfering systems co-existing within the same device. The invention is applicable to a large variety of communication systems. In the exemplary embodiment described herein, the present invention is described, without limitation, in terms of an implementation in an OFDM radio system.

In one aspect, the present invention is directed to a method in an OFDM radio receiver for reducing the impact of interference from an intermittent interfering signal received during reception of an OFDM symbol, wherein the OFDM symbol includes a guard interval (GI) portion, a middle portion, and a last portion identical to the GI. The method includes the steps of determining which portion of the OFDM symbol is contemporaneous with the interfering signal; and time-shifting an FFT window in the receiver to minimize or eliminate FFT processing of samples of the OFDM symbol that are contemporaneous with the interfering signal, thereby minimizing the impact of the interfering signal.

The OFDM receiver may receive an OFDM signal comprising a plurality of consecutive OFDM symbols, and may receive a plurality of intermittent interfering signals which are not time-synchronized with the OFDM symbols. In this case, the method may also include the steps of analyzing each OFDM symbol to determine which portion of each OFDM symbol, if any, is contemporaneous with the interfering signal; and time-shifting the FFT window in the receiver on a per-symbol basis, as needed, to minimize or eliminate FFT processing of samples of the OFDM symbol that are contemporaneous with the interfering signal, thereby minimizing the impact of the interfering signal.

When the interfering signal is periodic and the period is known or can be determined, the method may also include predicting which samples of each OFDM symbol will be contemporaneous with the interfering signals based on the period of the interfering signals and a known symbol rate for the OFDM signal. Placement of the FFT window can then be determined for future symbols.

In another aspect, the present invention is directed to an arrangement in an OFDM radio receiver for reducing the impact of interference from an intermittent interfering signal received during reception of an OFDM symbol, wherein the OFDM symbol includes a GI portion, a middle portion, and a last portion identical to the GI portion. The arrangement includes means for determining which portion of the OFDM symbol is contemporaneous with the interfering signal; and means for time-shifting an FFT window to minimize or eliminate FFT processing of samples of the OFDM symbol that are contemporaneous with the interfering signal, thereby minimizing the impact of the interfering signal.

In another aspect, the present invention is directed to a mobile communication device. The device includes an OFDM radio communication system having an OFDM transmitter and an OFDM receiver for transmitting and receiving an OFDM signal comprising a plurality of sequential OFDM symbols; an interfering radio frequency (RF) communication system having an RF transmitter and an RF receiver for transmitting and receiving an intermittent interfering signal having a duration shorter than an OFDM symbol and a period that is not time-synchronized with the OFDM symbols; and an arrangement for reducing the impact of interference in the OFDM receiver from the intermittent interfering signal. The arrangement includes means for analyzing each OFDM symbol to determine which portion of each OFDM symbol, if any, is contemporaneous with the interfering signal; and means for time-shifting an FFT window in the OFDM receiver on a per-symbol basis, as needed, to minimize or eliminate FFT processing of samples of the OFDM symbol that are contemporaneous with the interfering signal, thereby minimizing the impact of the interfering signal.

It should be noted that the present invention may also be utilized in receivers other than radio frequency (RF) receivers or OFDM receivers. In this aspect, the present invention is directed to a receiver for receiving a communication signal having a plurality of bit segments that are processed to extract information from the signal. The receiver includes means for digitizing the received signal; means for detecting that an intermittent interfering signal was received during reception of the signal; and means for processing the digitized signal to reduce the impact of the interfering signal. The processing means includes means for identifying a bit segment in which the interfering signal was received; means for determining which bits of the identified bit segment are contemporaneous with the interfering signal; and means for time-shifting a processing window to minimize or eliminate processing of the bits that are contemporaneous with the interfering signal, thereby minimizing the impact of the interfering signal.

BRIEF DESCRIPTION OF THE SEVERAL VIEWS OF THE DRAWING

In the following, the essential features of the invention will be described in detail by showing preferred embodiments, with reference to the attached figures in which.

DETAILED DESCRIPTION OF THE INVENTION

The present invention makes use of redundant information present in communication signals to reduce the negative impact of intermittent interference. Typically, but not necessarily, the interfering signal is caused by a communication system that transmits data in bursts, which are transmitted in a known pattern. In many cases, the transmission time of an interfering signal can be predicted because the interfering system transmits the signal in equally spaced time-slots. Examples of such communication systems are GSM and Bluetooth. By making use of the knowledge of when the interfering signal is expected to be present, the negative impact of the interference can be reduced. The present invention is applicable to a large variety of communication systems. In the exemplary embodiment described herein, the present invention is described, without limitation, in terms of an implementation in an OFDM radio system.

The present invention utilizes time division techniques to mitigate the interference. Co-existence of different types of RF systems may be handled in several ways. One technique is to utilize different frequencies in each of the systems. Another technique is to utilize time division, where the RF systems are coordinated in time so that no two systems are active at the same time. When the different transceivers are located in the very same device, i.e., very close to each other, using different frequency bands is usually not sufficient to avoid interference between the different systems due to practical problems related to filtering out strong interference. Therefore time division is often the only feasible way for such systems to co-exist.

For multiple systems to co-exist by means of time division, some type of collaboration between the systems is needed. For example, if it is known by a transmitting system that another system is receiving, the transmitting system may delay its transmission not to interfere with the receiving system. Alternatively, if the receiving system knows when the transmitting system is transmitting, the receiving system may choose not to use the information received during the time period when the transmitting system is transmitting because that information may be corrupted. Alternatively, the receiving system may rely on powerful coding and time interleaving to obtain the information.

Figure 6:
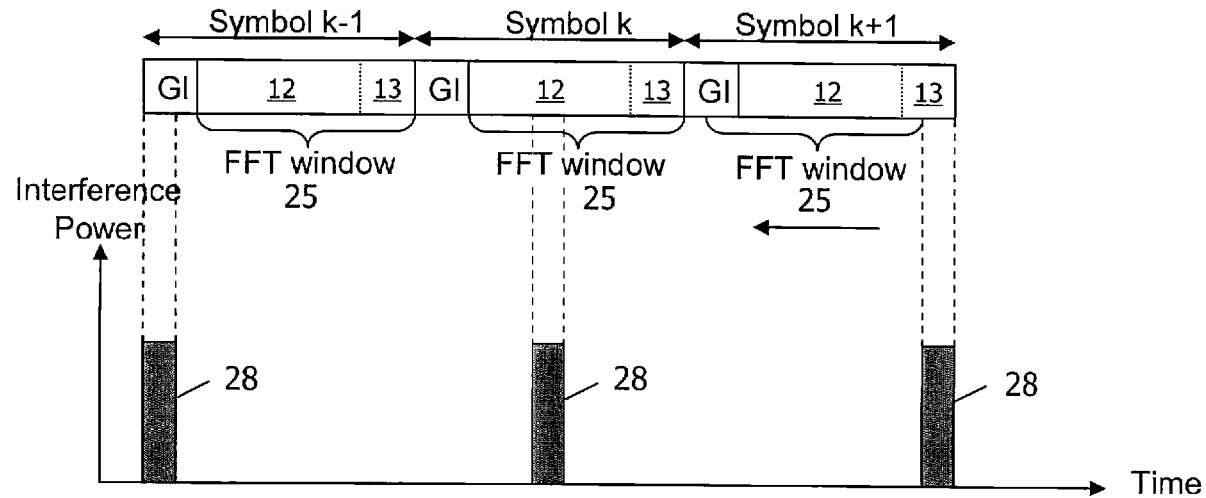
FIG. 6 is an illustrative drawing of a series of received symbols and an intermittent, strong interfering signal, which is mitigated by a first embodiment of the method of the present invention.

FIG. 6 is an illustrative drawing of a series of received symbols and an intermittent, strong interfering signal 28, which is mitigated by the present invention. The present invention exploits the predictability of interfering signal 28 and adjusts the position of the FFT window 25 to minimize interference. There is a certain degree of freedom in an OFDM receiver regarding which samples are utilized for the FFT. This freedom comes from the fact that the information in the last portion 13 of each symbol is identical to the GI 11. As previously noted, the transmitted signal in an OFDM system is generated by applying an IFFT and then copying the last portion of each symbol into the GI at the beginning of the symbol. The GI, therefore, does not contain any new information compared to what is found at the output of the IFFT, but rather adds redundancy to a portion of the information.

At the receiver, the location of the GI is found in a process referred to as time-synchronization, and the GI is then removed prior to applying the FFT. Once the location of the GI has been found so that synchronization is achieved, the FFT window is typically placed at the same position within the OFDM symbols relative to the GI for a large number of OFDM symbols before any adjustment is performed to account for channel variations. A typical number of symbols between adjustments may be in the range 100-10,000 symbols.

Figure 1:
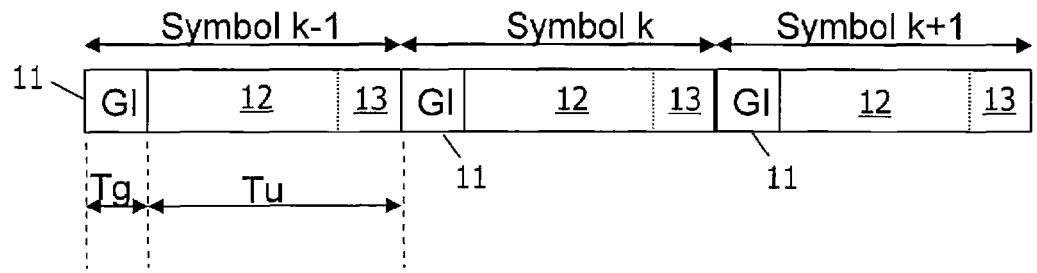
FIG. 1 (Prior Art) is an illustrative drawing of three symbols in a conventional OFDM signal.
Figure 2:
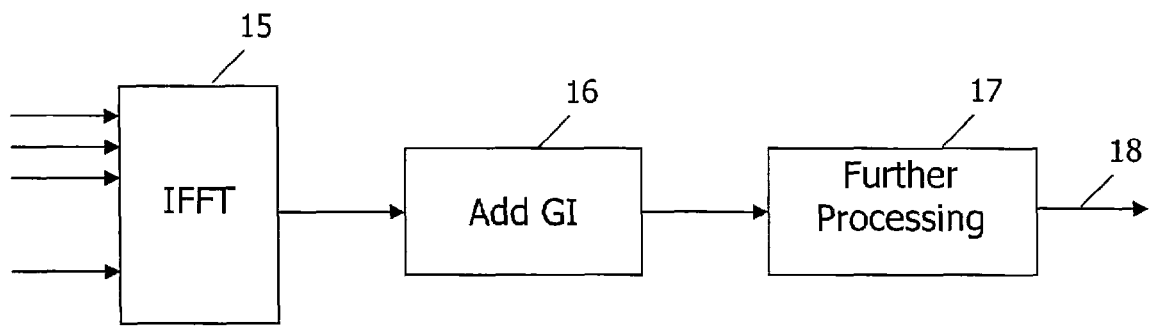
FIG. 2 (Prior Art) is a simplified flow chart of a conventional OFDM transmission process.
Figure 3:
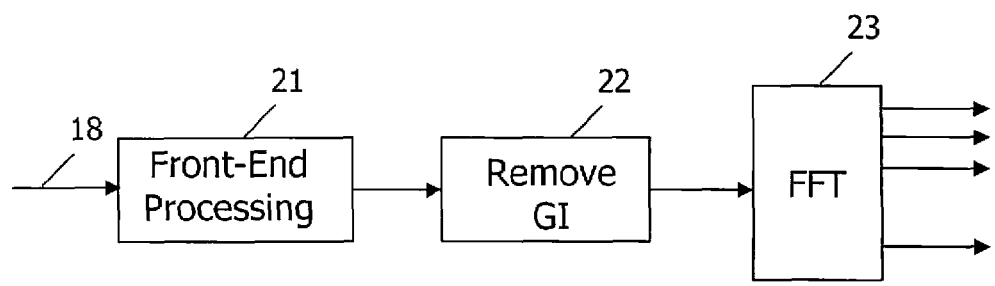
FIG. 3 (Prior Art) is a simplified flow chart of a conventional OFDM reception process.
Figure 4:
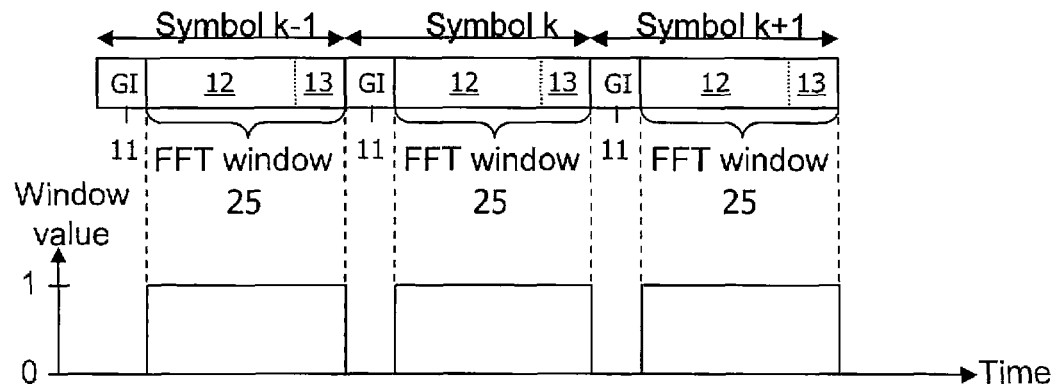
FIG. 4 (Prior Art) is an illustrative drawing of a conventional windowing process for removing the GIs from a series of received symbols.

It is commonly known that ISI-free reception results as long as the FFT is placed so that non-interfered samples are used for the FFT processing. In the absence of an interfering signal, the FFT window 25 may be placed as depicted in FIG. 4. Obviously, the FFT window cannot be processed later, since the samples from two different OFDM symbols would then be fed to the FFT, with ISI as a result. The FFT window may, however, be processed earlier. Since the information in the last portion 13 of each symbol is the same as the GI 11, the FFT window 25 can be processed earlier, as long as the prior symbol has no impact on the samples. If the delay spread of the channel is T_m (i.e., the length of the channel's impulse response is T_m seconds), and the length of the GI is T_g seconds, then the FFT window can be time-shifted up to (T_g-T_m) seconds earlier. Noteworthy is here that as long as the FFT window is placed within the allowed interval as described above, then the performance will be the same as far as noise is concerned.

In case of intermittent interference, however, the performance also depends on how the FFT window 25 is placed relative to when the interferer is active. Since the placement of the FFT window can be viewed as gating the samples entering the FFT, the position of the FFT window determines how much the interference will impact the performance.

Figure 5:
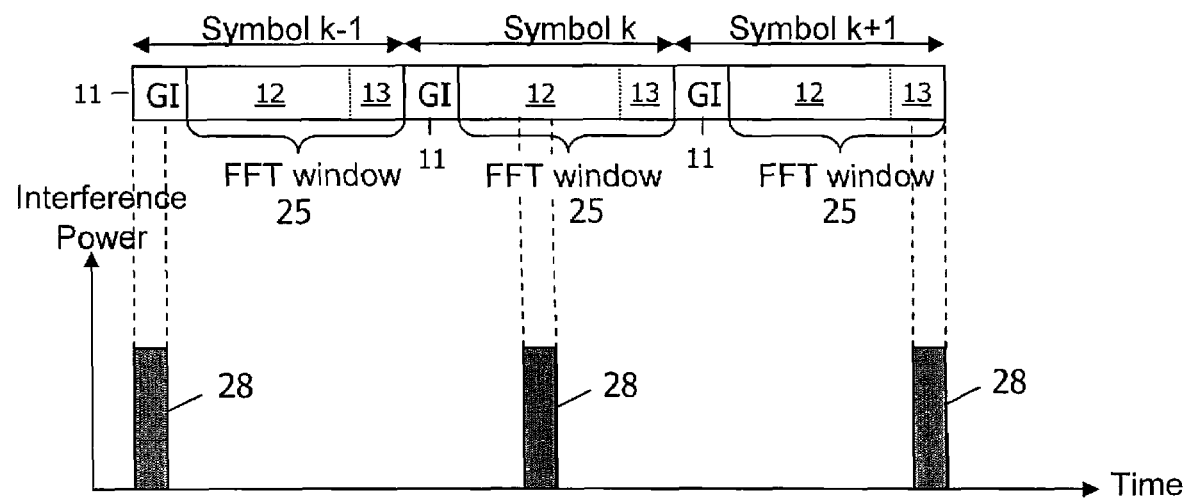
FIG. 5 (Prior Art) is an illustrative drawing of a series of conventional received symbols and an intermittent, strong interfering signal, which is present for only a small fraction of the total FFT window.

Referring briefly to FIG. 5, it is seen that the interfering signal 28 coincides with both Symbol k−1 and Symbol k+1. However, of these symbols, the interfering signal only has an impact on Symbol k+1. In Symbol k−1, the interfering signal corrupts only the GI 11, which is removed prior to FFT processing.

Referring again to FIG. 6, the impact of the intermittent interfering signal 28 is minimized by time-shifting the FFT window 25 in each symbol to minimize the number of corrupted samples. In symbol k−1, for example, the FFT window is not moved because the interfering signal impacts only the GI. In Symbol k, the interfering signal impacts the middle of the symbol, and the FFT window cannot be moved enough to avoid this interference. In Symbol k+1, however, the FFT window is shifted forward so that the samples corrupted by the interfering signal fall outside the window. The gain obtainable in this way depends on several parameters, such as the duration of the interfering signal, the interval between interfering signals, and the length of the GI. If the duration of the interfering signal is short relative to the GI, then a substantial gain is more easily obtained. Specifically, if this is the case and the duration between the bursts equals or exceeds the duration of an OFDM symbol plus the duration of the corresponding GI, then it may be possible to reduce the impact of the interference to zero.

Figure 7:
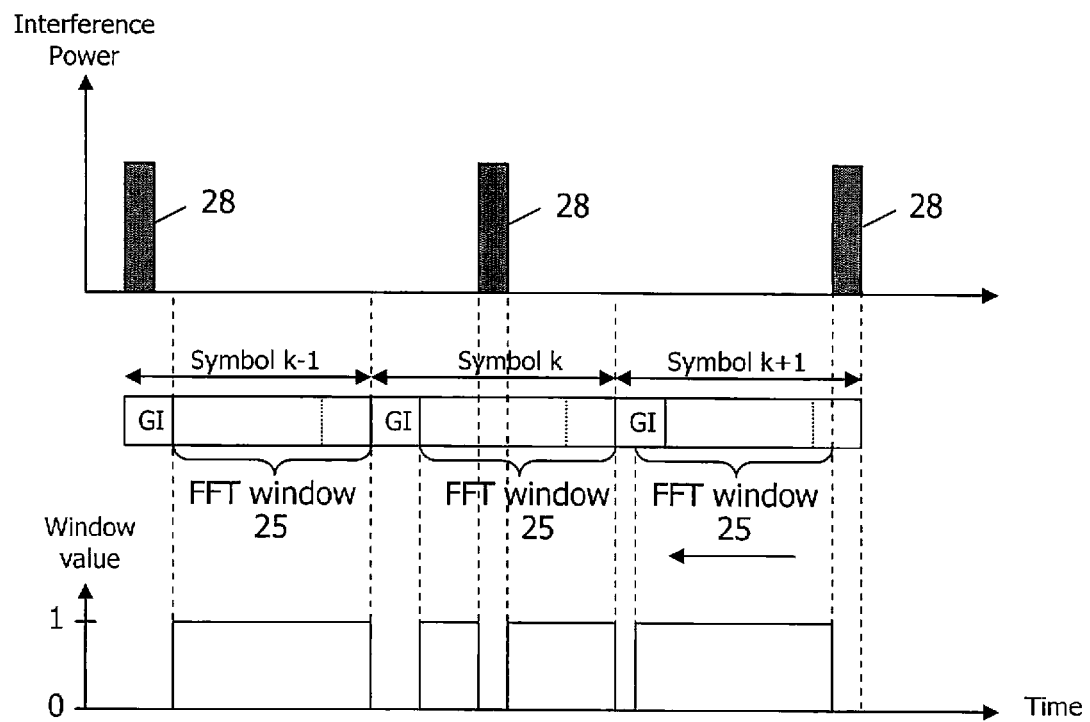
FIG. 7 is an illustrative drawing of a series of received symbols and an intermittent, strong interfering signal, which is mitigated by a second embodiment of the method of the present invention.

FIG. 7 is an illustrative drawing of a series of received symbols and an intermittent, strong interfering signal 28, which is mitigated by another embodiment of the present invention. In this embodiment, FFT windows are moved if doing so does not cause ISI. However, for a symbol such as Symbol k, this cannot be done. Therefore, in Symbol k, a weighting for the samples coinciding with the interfering signal may be set to a value less than one, because the interference is determined to be so strong that attenuating the corresponding samples with a weighting factor less than one improves performance. In the example shown in FIG. 7, the weighting factor is set to zero. Setting some samples at the input of the FFT equal to zero means that the sub-carriers are no longer orthogonal. Thus, the removal of the interference may also cause some distortion known as inter-carrier interference (ICI). Therefore the amount of gain that can be obtained is dependent upon the strength and the duration of the interferer. The largest gain is obtained in case of strong interference with short duration.

The OFDM receiver may also analyze the plurality of intermittent interfering signals to identify a type of system generating the interfering signals. For example, characteristics of the signals may identify the system as a Bluetooth system. Based on the identified type of system, the OFDM receiver can then determine a predicted periodicity of the interfering signals. With the known symbol rate for the OFDM signal, the receiver can then predict which samples of each OFDM symbol will be contemporaneous with the interfering signals based on the predicted periodicity of the interfering signals. The required shifts of the FFT window can then be determined for each symbol ahead of time.

Figure 8:
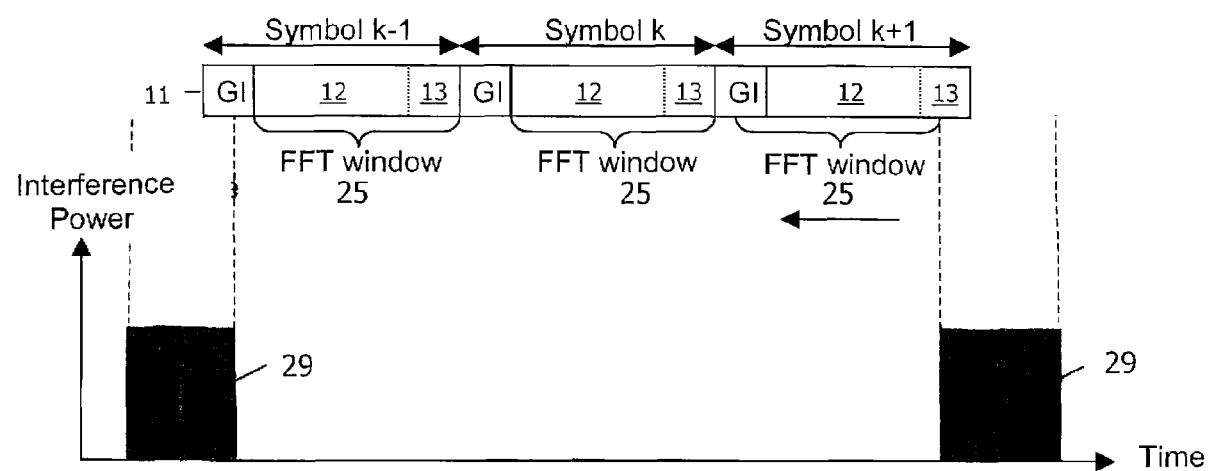
FIG. 8 is an illustrative drawing of a series of received symbols and an intermittent, strong interfering signal, which is mitigated by a third embodiment of the method of the present invention.

FIG. 8 is an illustrative drawing of a series of received symbols and an intermittent, strong interfering signal 29, which is mitigated by a third embodiment of the method of the present invention. In this embodiment, the interfering signal has a duration longer than the GI 11. For example, in an OFDM signal such as DVB-H, the symbol duration may include a GI of 224 μs and a useful part of 896 μs. An interfering GSM signal may have a duration of 557 μs, more than twice the duration of the GI. Additionally, Bluetooth signals may be as long as 300-350 μs when one-slot packets are utilized.

The present invention may still be useful to reduce the effects of the interfering signal when only a portion of the interfering signal interferes with the OFDM symbols. As shown in FIG. 8, the interfering signal only interferes with the GI of Symbol k−1, and thus will have no effect when the GI is discarded prior to FFT processing. For Symbol k+1, the interfering signal only interferes with the last portion of the symbol. Therefore, the invention time-shifts the FFT window 25 forward to process only those samples that are not contemporaneous with the interfering signal. Since the information in the GI and the last portion of the symbol is identical, the shifting of the FFT window has no effect on the received signal.

Figure 9:
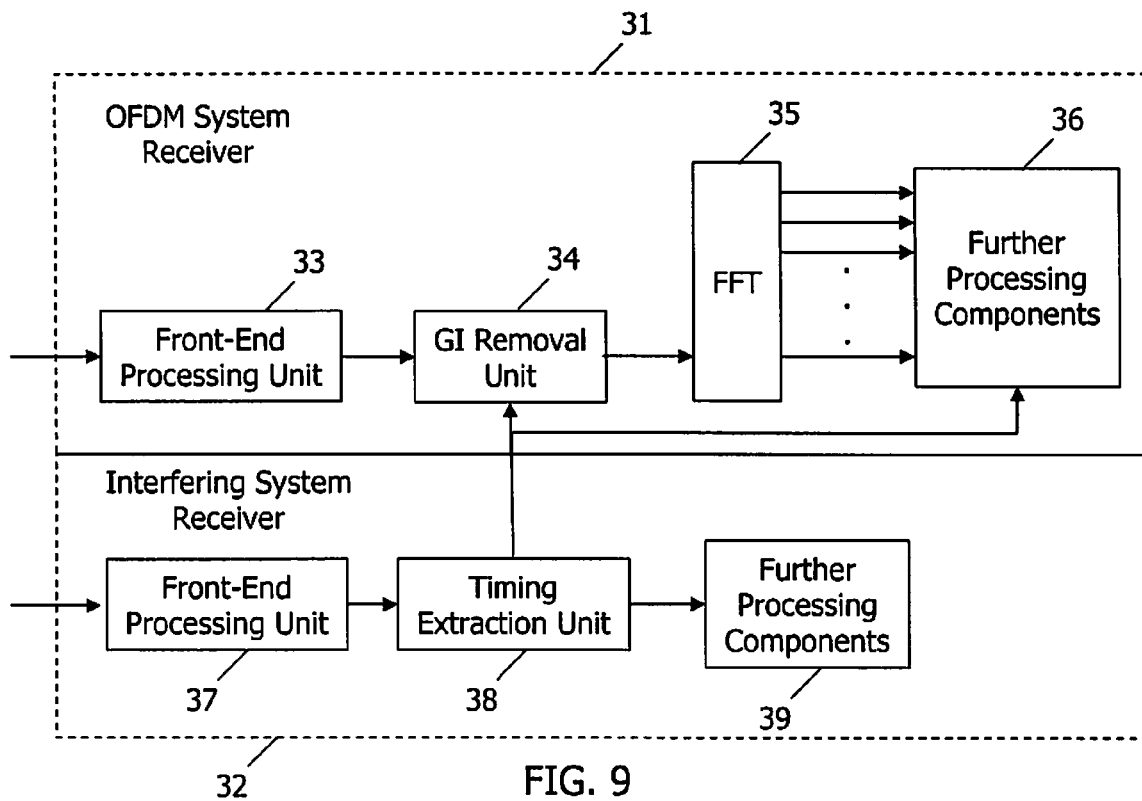
FIG. 9 is a simplified block diagram of a first exemplary embodiment of the system of the present invention.

FIG. 9 is a simplified block diagram of a first exemplary embodiment of the system of the present invention. Both an OFDM system and an interfering system such as a Bluetooth system are implemented in a single device. In this embodiment, the interfering signal is transmitted by a remote device (not shown) and is received by both an OFDM receiver 31 and an interfering system receiver 32. The OFDM receiver includes a front-end processing unit 33, a unit 34 for removing the GI, an FFT 35, and components for further processing 36. The interfering system receiver includes a front-end processing unit 37, a timing extraction unit 38, and further processing components 39.

The timing extraction unit 38 in the interfering system receiver 32 determines the duration of each interfering signal burst, determines the interval between each burst, and reports this timing information to the OFDM system receiver 31. The unit for removing the GI determines whether an interfering signal burst falls within the GI 11 of an OFDM symbol. If so, the GI is removed as normal and the negative effect of the interfering signal is eliminated when the FFT is processed. If the unit for removing the GI determines that the interfering signal burst falls within the last portion 13 of an OFDM symbol, the FFT window 25 is shifted forward, and the corrupted last portion is removed instead of the GI. Once again, the negative effect of the interfering signal is eliminated when the FFT is processed. If the interfering signal burst falls within the middle portion 12 of an OFDM symbol, the weighting factor for the samples coinciding with the interfering signal may be set to zero or some other value less than one. As noted previously, setting the weighting factor to zero may cause some ICI, requiring further processing by the components 36.

Figure 10:
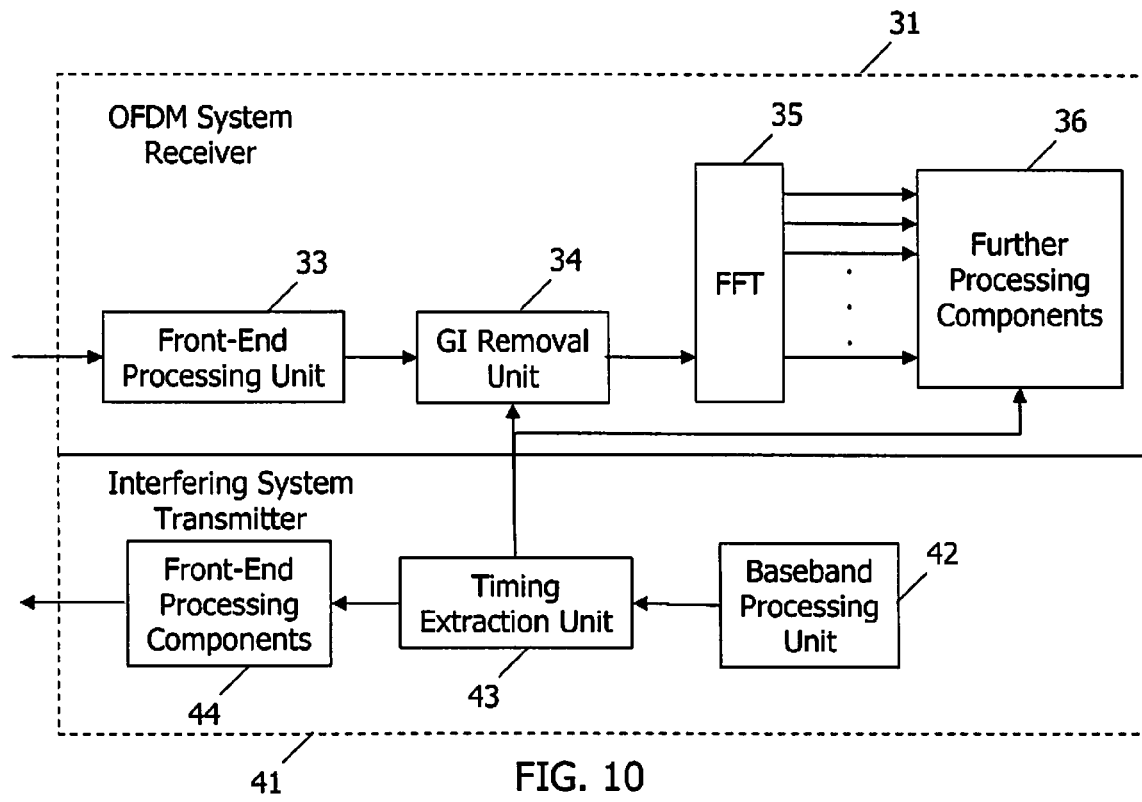
FIG. 10 is a simplified block diagram of a second exemplary embodiment of the system of the present invention.

FIG. 10 is a simplified block diagram of a second exemplary embodiment of the system of the present invention.

Once again, both an OFDM system and an interfering system such as a Bluetooth system are implemented in a single device. In this embodiment, the interfering signal is transmitted by a co-existing interfering system transmitter 41 and is received by the OFDM system receiver 31. The interfering system transmitter includes a baseband processing unit 42, a timing extraction unit 43, and front-end processing components 44.

The timing extraction unit 43 in the interfering system transmitter 41 determines the duration of each interfering signal burst, determines the interval between each burst, and reports this timing information to the OFDM system receiver 31. The unit for removing the GI determines whether an interfering signal burst falls within the GI 11 of an OFDM symbol. If so, the GI is removed as normal and the negative effect of the interfering signal is eliminated when the FFT is processed. If the unit for removing the GI determines that the interfering signal burst falls within the last portion 13 of an OFDM symbol, the FFT window 25 is shifted forward, and the corrupted last portion is removed instead of the GI. Once again, the negative effect of the interfering signal is eliminated when the FFT is processed. If the interfering signal burst falls within the middle portion 12 of an OFDM symbol, the weighting factor for the samples coinciding with the interfering signal may be set to zero or some other value less than one. As noted previously, setting the weighting factor to zero may cause some ICI, requiring further processing by the components 36.

Based on the timing information sent from the interfering system transmitter 41 to the OFDM system receiver 31, the OFDM receiver may predict which samples of each OFDM symbol will be contemporaneous with the interfering signals based on the periodicity of the interfering signals and a known symbol rate for the OFDM signal. The required shifts of the FFT window can then be determined for each symbol ahead of time.

Although preferred embodiments of the present invention have been illustrated in the accompanying drawings and described in the foregoing Detailed Description, it is understood that the invention is not limited to the embodiments disclosed, but is capable of numerous rearrangements, modifications, and substitutions without departing from the scope of the invention. The specification contemplates any all modifications that fall within the scope of the invention defined by the following claims.

What is claimed is:

1. A method in an Orthogonal Frequency Division Multiplexing (OFDM) radio receiver for reducing the impact of interference from an intermittent interfering signal received during reception of an OFDM symbol, wherein the OFDM symbol includes a guard interval (GI) portion, a middle portion, and a last portion identical to the GI portion, said method comprising:
   determining which portion of the OFDM symbol is contemporaneous with the interfering signal; and
   time-shifting a fast Fourier transform (FFT) window in the receiver to minimize or eliminate FFT processing of samples of the OFDM symbol that are contemporaneous with the interfering signal, thereby minimizing the impact of the interfering signal,
   wherein the OFDM receiver receives an OFDM signal comprising a plurality of consecutive OFDM symbols, and receives a plurality of intermittent interfering signals which are not time-synchronized with the OFDM symbols, wherein the method further comprises:

analyzing each OFDM symbol to determine which portion of each OFDM symbol, if any, is contemporaneous with the interfering signal; and time-shifting the FFT window in the receiver on a per-symbol basis, as needed, to minimize or eliminate FFT processing of samples of each OFDM symbol that are contemporaneous with the interfering signal.

2. The method according to claim 1, further comprising:

if one of the plurality of intermittent interfering signals is contemporaneous with the middle portion of one of the plurality of consecutive OFDM symbols, setting a weighting factor to a value less than one for the samples of the middle portion that are contemporaneous with the interfering signal; and FFT processing the samples of the OFDM symbol in the FFT window, with the weighting factor applied to the samples that are contemporaneous with the interfering signal.

3. The method according to claim 2, wherein the step of setting a weighting factor includes setting the weighting factor to the value less than one only if a signal strength of the interfering signal exceeds a predefined threshold value.

4. The method according to claim 1, further comprising:

analyzing the plurality of intermittent interfering signals to identify a type of system generating the interfering signals;

determining a predicted period of the interfering signals based on the identified type of system; and predicting which samples of each OFDM symbol will be contemporaneous with the interfering signals based on the predicted period of the interfering signals and a known symbol rate for the OFDM signal.

5. The method according to claim 1, wherein the OFDM radio receiver and an interfering system co-exist in a single device, and the method further comprises:

sending information from the interfering system to the OFDM receiver regarding a period of the interfering signals; and predicting which samples of each OFDM symbol will be contemporaneous with the interfering signals based on the period of the interfering signals and a known symbol rate for the OFDM signal.

6. An arrangement in an Orthogonal Frequency Division Multiplexing (OFDM) radio receiver for reducing the impact of interference from an intermittent interfering signal received during reception of an OFDM symbol, wherein the OFDM symbol includes a guard interval (GI) portion, a middle portion, and a last portion identical to the GI portion, said arrangement comprising:

means for determining which portion of the OFDM symbol is contemporaneous with the interfering signal; and means for time-shifting a fast Fourier transform (FFT) window to minimize or eliminate FFT processing of samples of the OFDM symbol that are contemporaneous with the interfering signal, thereby minimizing the impact of the interfering signal;

wherein the OFDM receiver receives an OFDM signal comprising a plurality of consecutive OFDM symbols, and receives a plurality of intermittent interfering signals which are not time-synchronized with the OFDM symbols, wherein the arrangement further comprises:

means for analyzing each OFDM symbol to determine which portion of each OFDM symbol, if any, is contemporaneous with the interfering signal; and means for time-shifting the FFT window in the receiver on a per-symbol basis, as needed, to minimize or eliminate FFT processing of samples of each OFDM symbol that are contemporaneous with the interfering signal, thereby minimizing the impact of the interfering signal process in an FFT.

7. The arrangement according to claim 6, further comprising:

means, responsive to a determination that one of the plurality of intermittent interfering signals is contemporaneous with the middle portion of one of the plurality of consecutive OFDM symbols, for setting a weighting factor to a value less than one for the samples of the middle portion that are contemporaneous with the interfering signal, prior to processing the samples in the FFT.

8. The arrangement according to claim 7, wherein the means for setting a weighting factor is further adapted to set the weighting factor to the value less than one only if a signal strength of the interfering signal exceeds a predefined threshold value.

9. The arrangement according to claim 6, further comprising:

means for analyzing the plurality of intermittent interfering signals to identify a type of system generating the interfering signals;

means for determining a predicted period of the interfering signals based on the identified type of system; and means for predicting which samples of each OFDM symbol will be contemporaneous with the interfering signals based on the predicted period of the interfering signals and a known symbol rate for the OFDM signal.

10. The arrangement according to claim 6, wherein the OFDM radio receiver and an interfering system co-exist in a single device, and the arrangement further comprises:

a timing extraction unit for sending information from the interfering system to the OFDM receiver regarding a period of the interfering signals; and means within the OFDM receiver for predicting which samples of each OFDM symbol will be contemporaneous with the interfering signals based on the period of the interfering signals and a known symbol rate for the OFDM signal.

11. A mobile communication device for operating in an Orthogonal Frequency Division Multiplexing (OFDM) radio communication system in which an interfering radio frequency (RF) communication system transmits an intermittent interfering signal, said mobile communication device comprising:

an OFDM transmitter and an OFDM receiver for transmitting and receiving an OFDM signal comprising a plurality of sequential OFDM symbols, wherein each OFDM symbol includes a guard interval (GI) portion, a middle portion, and a last portion identical to the GI portion; and an arrangement for reducing the impact of interference in the OFDM receiver when the intermittent interfering signal is transmitted during reception of the OFDM symbols, said arrangement comprising:

means for analyzing each OFDM symbol to determine which portion of each OFDM symbol, if any, is contemporaneous with the interfering signal; and means for time-shifting a fast Fourier transform (FFT) window in the OFDM receiver on a per-symbol basis, as needed, to minimize or eliminate FFT processing of samples of the OFDM symbol that are contemporaneous with the interfering signal, thereby minimizing the impact of the interfering signal.

12. The mobile communication device according to claim 11, wherein the time-shifting means is adapted to time-shift the FFT window to process samples in the middle portion and the last portion of an OFDM symbol if the interfering signal is contemporaneous with the GI portion of the OFDM symbol.

13. The mobile communication device according to claim 11, wherein the time-shifting means is adapted to time-shift the FFT window to process samples in the GI portion and the middle portion of an OFDM symbol if the interfering signal is contemporaneous with the last portion of the OFDM symbol.

14. The mobile communication device according to claim 11, wherein the arrangement for reducing the impact of interference also includes:

a timing extraction unit in the interfering RF communication system for sending information to the OFDM receiver regarding a period of the interfering signals; and means within the OFDM receiver for predicting which samples of each OFDM symbol will be contemporaneous with the interfering signals based on the period of the interfering signals and a known symbol rate for the OFDM signal.

* * * * *